April 28, 1953     H. H. PARKER     2,636,474
ANIMAL FEEDING DEVICE
Filed March 21, 1949     2 SHEETS—SHEET 1
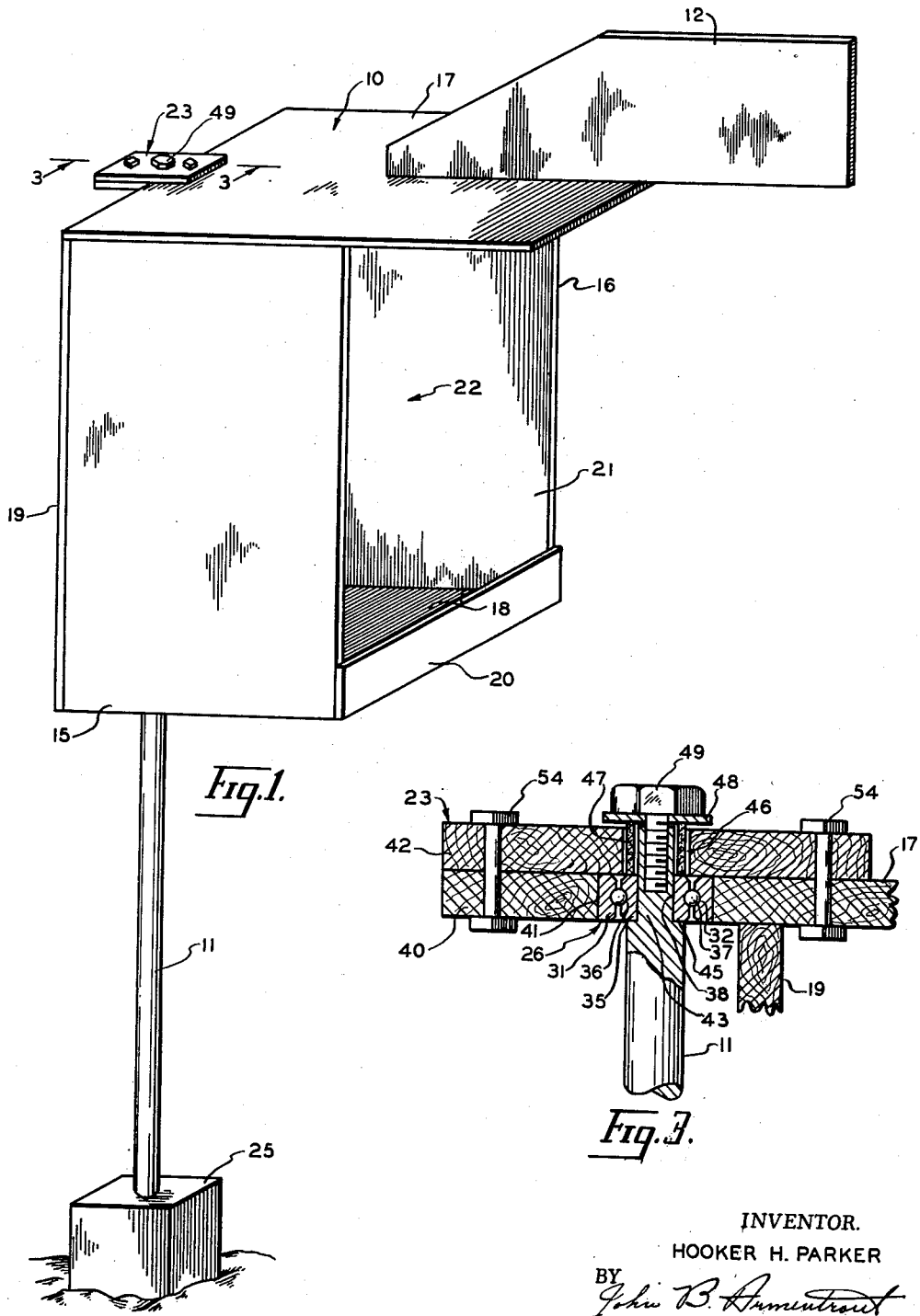
INVENTOR.
HOOKER H. PARKER
BY
ATTORNEY April 28, 1953     H. H. PARKER     2,636,474
ANIMAL FEEDING DEVICE
Filed March 21, 1949     2 SHEETS—SHEET 2
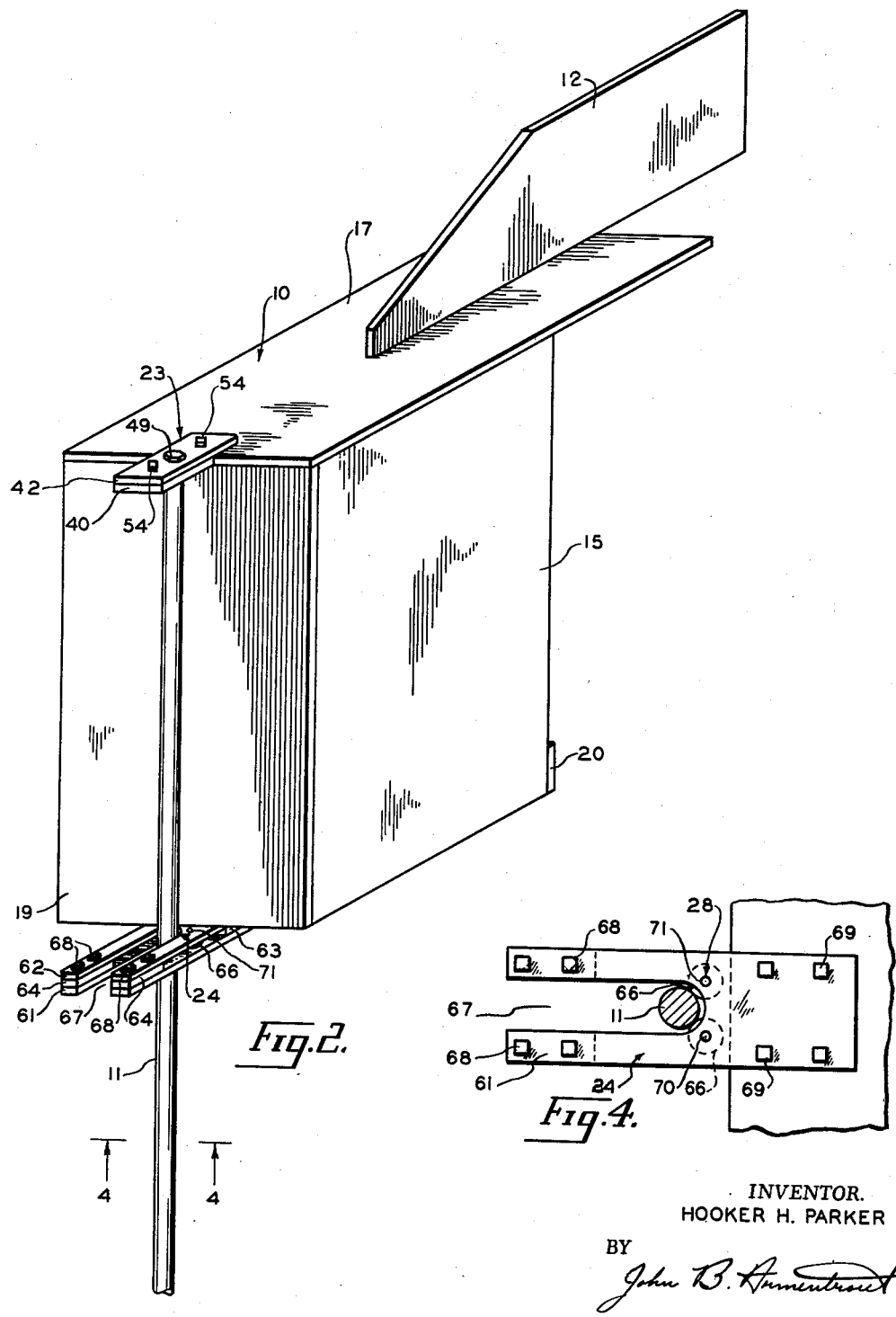
INVENTOR.
HOOKER H. PARKER
BY
John B. Armentrout
ATTORNEY Patented Apr. 28, 1953

2,636,474

UNITED STATES PATENT OFFICE 2,636,474

ANIMAL FEEDING DEVICE

Hooker H. Parker, Arcadia, Fla.

Application March 21, 1949, Serial No. 82,681

5 Claims. (Cl. 119—51)

This invention relates to animal feeding devices and more particularly to devices of this character for outdoor use.

An object of my invention is the provision of a simple and practical wind-operated device for housing food products such as minerals or grain for access by animals and for shielding the food from the weather.

Another object of my invention is that of providing a feed receptacle for feeding animals, the receptacle being well suited for shifting position with changes in direction of the wind and bringing a food access opening therein to leeward position away from the weather.

A further object of my invention is the provision of a simply pivotal wind-operated feeding device for animals which is easy to construct and is reliable in operation.

Another object of my invention is that of providing a wind-operated feed receptacle for animals which affords a large proportion of the area thereof as useful pressure area for the wind operation.

A still further object of my invention is the provision of a pivotal wind-operated feed receptacle such as for horses, cattle, or other livestock, the receptacle being capable of pivoting readily when urged by the wind or when jolted by the livestock.

Other objects of my invention will in part be obvious and in part pointed out more fully hereinafter.

The invention accordingly consists in the several parts, combination of elements, and features of construction, and in the relation of each of the same to one or more of the others as described herein, the scope of the application of which is indicated in the following claims.

In the accompanying drawing representing a preferred embodiment of my invention:

Figure 1 is a front and side perspective view of a pivotally mounted wind-operated receptacle for feeding livestock;

Figure 2 is a rear and side perspective view of the device in Figure 1;

Figure 3 is a vertical section on an enlarged scale of the upper pivot of the feed receptacle taken along the line 3—3 in Figure 1; and Figure 4 is a bottom view on an enlarged scale of the lower pivot of the receptacle, seen from position 4—4 in Figure 2.

Like reference numerals denote like portions or parts throughout the several figures of the drawings.

As conducive to a clearer understanding of certain features of my invention, it may be noted at this point that feed receptacles of the outdoor type are in considerable demand for holding food in readiness for animals and out of the weather until the food is consumed. A variety of these receptacles are intended to rotate in the wind, thus to bring a feed access opening therein to leeward position and thereby shield the food. Some of the feed receptacles are of a relatively small kind and, for example, are intended to afford a sanctuary for birds so that these animals may feed on deposits of grain, flour, bread, or the like, without having the food blown away or destroyed by the outdoor elements. There are other feed receptacles as for livestock or large animals. A number of these illustratively afford a housing for rock salt or other edible minerals, grains, or the like, and are intended for wind operation to protect the food and yet hold it in readiness for use.

With regard to many heretofore known animal feed receptacles, a considerable amount of difficulty has been encountered from the standpoint of failure to achieve pivotal action to bring the food access opening to leeward position. The receptacles for example are too easily neutralized by air forces which are exerted against the outside areas for a given direction of the wind, these forces being centered on opposite sides of the receptacle pivot, thus arresting movement or seriously detracting from the total effective wind pressure needed for forceful rotation or pivotal action. Under these conditions, the kind of pivot means usually employed has parts inside the receptacle and in contact with the food which on occasions rapidly corrodes the pivot bearings or the like, as where rock salt is the stored commodity. In this connection too, the pivot means often detracts from the amount of available space in the food storage portion of the receptacle or arrests or impairs access to the food by the animals. Where certain of the receptacles are utilized for feeding such animals as livestock, it is too easy for the animals to apply a body blow or jolt, blocking the pivotal movement in both directions and tending to break the equipment or injure the animal.

An outstanding object of my invention accordingly is the provision of an outdoor receptacle for feeding animals, which is thoroughly capable of pivoting to keep the food contained therein from the weather, all with freedom of the food from the pivot means, and which receptacle operates substantially free of opposed wind forces relative to the pivot.

Referring now more particularly to the practice of my invention, I provide animal feed receptacles having a pivotal mounting behind the receptacle for wind operation. In this, I find that the receptacle and its pivot, by virtue of their relative positions, assure forceful wind operation. Certain of the receptacle's sides, for example, are fully receptive to the wind for urging rotation of the unit, as distinguished from receiving wind forces which detract from the pivotal action. A more powerful movement thus is achieved for a given wind force and this movement is enhanced in power by the lever arm or distance between the receptacle wind force centers and the pivot. Also, by disposing the pivot behind the receptacle, all motion points such as in the pivot bearings are kept free of the food space thus giving greater space and freedom from contact with the food.

In the illustrative embodiment of my invention represented in the accompanying drawing, I provide a feed receptacle 10 such as for feeding livestock. This receptacle conveniently comprises two spaced substantially parallel rectangular sides 15 and 16 and a substantially rectangular back 19 disposed at approximately right angles to these sides and connected to the same so as to provide a channel-like configuration. A roof or top 17, also conveniently rectangular, abuts the top edges of sides 15 and 16 and back 19 so as to close off the space between these edges. The receptacle 10 further has a rectangular bottom 18 interconnecting the lower ends of sides 15 and 16 and back 19, to support the food. At the front of the receptacle, an apron 20 conveniently extends up from bottom 18 and interconnects the sides 15 and 16 thus to serve as blocking means for preventing the escape of food from the receptacle bottom, yet leaving front access opening 21 above so that animals may reach feed in compartment 22. Roof 17 advantageously extends a considerable distance in front of the forward edges of sides 15 and 16 thus affording shelter for the access opening 21 and compartment 22. The sides, back, roof, bottom, and apron of the receptacle 10 illustratively are made of wooden boards suitably secured together in their relative positions as to provide a substantially weather-tight unit. On occasions, I cover the receptacle with weather-proof paper or the like, such as by applying the same to the outside surfaces and nailing in place.

The feed receptacle has upper and lower supports 23 and 24 at the rear thereof which respectively provide an upper bearing 26 and a lower side-access bearing 28 for a vertical shaft 11 or other suitable mounting. The shaft 11 illustratively has its lower end imbedded in a concrete footing 25, this footing for example being in or on the ground. Upper bearing 26 advantageously is an annular bearing including an outer ring 31 which in the inner face has an annular groove or race 32 for ball bearing operation. Support 23 corresponding to this bearing illustratively comprises a lever arm 40, such as a backward extension of the feed box roof 17. The lever arm 40 has a hole 41 therethrough for receiving the outer wall of the bearing ring 31 as by press fit. To assure retention of the ring 31 against upward thrust relative to arm 40, I usually employ restraining means, as for example plate 42 fastened to the lever 40 so as to cover at least a part of the top surface of the ring and thus block the same against movement. Bolts 54 and corresponding nuts conveniently serve for fastening the lever and plate together one on top the other.

Inside the ring 31 is a core piece 35 having an annular groove or race 36 corresponding to the groove 32. These grooves are adjacent to each other and support annularly disposed balls 37 which separate the core and ring for relative rotation, yet interlock the core and ring against longitudinal displacement. A longitudinal bore 38 extends through the core and is axially disposed relative to the ball races or grooves 32 and 36. This bore receives a closely fitting stud 43, or the like, which conveniently is a reduced diameter axial extension of the feed box post 11. A stop 45, such as a shoulder formed between post 11 and stud 43, abuts the lower end of the core 35 and arrests downward movement of the bearing 26. Stud 43 conveniently passes through an opening 46 in the plate 42 and receives a collar 47 which is long enough to reach from abutment with the top surface of core 35 to somewhat above the outside surface of the plate. In this, the collar remains substantially clear of the wall of opening 46. A washer 48 on stud 43, and against the outer end of collar 47, clears the plate 42 and substantially covers the opening 46. A fastening element, such as a bolt 49 engaging threads in the outer end of stud 43, conveniently holds the washer in place and drives collar 47 and core 35 together in tight non-rotating relation with respect to the stop 45, leaving ring 31 and the upper bearing support inclusive of lever 40 and plate 42 free to rotate as a unit with the feed box 10.

The lower support 24 of the feed receptacle, corresponding to the bearing 28 preferably is bifurcated, giving, for example, an open substantially U-shaped outer end having a pocket 67 for receiving the shaft 11. In this regard, the lower support illustratively includes two bifurcated lever arms 61 and 62 held apart one above the other by spacing elements 63 and 64. A plurality of bolts 68 and corresponding nuts for example hold the lever arms and spacing elements together as a unit. Bolts 69 and corresponding nuts conveniently secure the inner end of this assembly to the underneath side of the receptacle bottom, pocket 67 being behind the receptacle.

Between the lever arms 61 and 62 of support 24 are at least two spaced anti-friction rollers 66 such as of the ring and core ball-race type. These rollers for example have axial bores as through their respective cores and are mounted with their bores on bolts or pins 70 and 71 between the lever arms 61 and 62. In mounted position rollers 66 have their outer rings or rims protruding beyond the inside edges of the bifurcated lever arms and into the space or pocket 67, such as on opposite sides of the back of the latter, thus representing a preferred embodiment of the lower bearing 28.

In mounting the feed receptacle 10 for operation on the vertical shaft 11, the upper bearing 26 is readily lowered on stud 43 and seated against stop 45, and open outer end of lower support 24 readily admits the shaft between, and in abutment laterally against, roller 66 of the lower side-access bearing 28. In this, the shaft 11 is laterally approached with the outer end of support 24 to admit the shaft to the back of the open pocket 67. In certain instances, I provide suitable closure means such as a latch (not shown) on the support 24 for closing or bridging across the outer end of pocket 67, thus to keep the shaft 11 inside the pocket. Collar 47, washer 48 and bolt 49 are easily added for holding the upper bearing 26 on the shaft in the manner hereinbefore described. The feed receptacle 10 thus is operative in the wind about an axis behind the receptacle as provided by the shaft 11 and upper and lower bearings 26 and 28. The power and effect of the wind on the outside area of the receptacle, such as on either of the sides 15 or 16, is greatly enhanced by virtue of the position of the pivot. Thus, for example, whether the receptacle is loaded with rock salt or with lighter material, a positive pivoting movement of the receptacle is had to leeward position of the access opening 21. To gain increased power of rotation, on occasions I find advantage in employing a vane 12 on the outside of the receptacle 10, such as mounted on the roof 17 and illustratively extending beyond the forward edge of the latter. This vane, for example, is made of wood or of any other suitable material, and is so disposed in direction as to add to the effective wind pressure area of the sides of the receptacle 10 as by being in vertical position along the front-to-back center line of the roof 17 in advance of the pivot.

When the receptacle 10 moves in the wind, upper and lower supports 23 and 24 move with the receptacle, turning ring 31 relative to the core 35, as separated by anti-friction balls 37, and turning rollers 66 on the shaft 11. This operation ceases when access opening 21 of the receptacle reaches leeward position.

Thus it will be seen that in this invention there is provided an animal feeding device in which the various objects noted herein together with many thoroughly practical advantages are successfully achieved. It will be seen that the feeding device is highly effective in wind operation and for the protection of feed outdoors, without destroying access to the feed by animals.

As many possible embodiments may be made of my invention and as many changes may be made in the embodiment hereinbefore set forth, it will be understood that all matter described and illustrated herein is to be interpreted as illustrative and not as a limitation.

I claim:

1. A wind adjustable feeding device for animals, said device comprising a receptacle having an open front to provide access to a feed compartment therein by animals and otherwise being substantially closed for shielding said compartment from the weather, outside areas of said receptacle along the front to back length of said compartment being for exposure to the wind for rotation of the receptacle, and lever means extending rearwardly from said receptacle and supporting bearing means offset to behind said feed compartment and said outside areas, for said receptacle to rotate in the wind to leeward position of said open front and thus more effectively shield said compartment from the weather.

2. A wind adjustable feeding device for animals, said device comprising a receptacle having an open front to provide access to a feed compartment therein by animals and otherwise being substantially closed for shielding said compartment from the weather, outside areas of said receptacle along the front to back length of said compartment being for exposure to the wind for rotation of the receptacle, and upper and lower lever arms extending from the main body of said receptacle to behind the same and respectively supporting bearings offset to behind said feed compartment and said wind areas along the feed compartment, for said receptacle to rotate in the wind to leeward position of said open front and thus more effectively shield said compartment from the weather.

3. A wind adjustable feeding device for animals, said device comprising a receptacle having an open front to provide access to a feed compartment therein by animals and otherwise being substantially closed for shielding said compartment from the weather, outside areas of said receptacle along the front to back length of said compartment being for exposure to the wind for rotation of the receptacle, a shaft for supporting said receptacle to rotate in the wind to leeward position of said open front thus more effectively to shield said feed compartment, upper and lower supports extending from the main body of said receptacle to behind the same and said wind areas, said lower support having a bifurcated outer end for laterally receiving said shaft, and upper and lower bearings respectively mounted to said supports behind the main body of said receptacle and said outside areas, said upper bearing being an annular bearing for receiving an upper reduced end of said shaft, and said lower bearing protruding into the pocket of said bifurcated end of the lower support for laterally abutting said shaft.

4. A wind adjustable feeding device for animals, said device comprising a receptacle having an open front to provide access to a feed compartment therein by animals and otherwise being substantially closed for shielding said compartment from the weather, outside areas of said receptacle along the front to back length of said compartment being for exposure to the wind for rotation of the receptacle, upper and lower bearings supported to behind the main body of said receptacle and said wind areas, and a mounting including a shaft for supporting said receptacle through said bearings for said receptacle to rotate in the wind to leeward position of said open front and thus more effectively shield said compartment from the weather.

5. A wind adjustable feeding device for animals and for mounting on a substantially vertical post to rotate powerfully in the wind relative to said post, said device comprising, a receptacle having an open front to provide access to a feed compartment therein by animals and being otherwise substantially closed for shielding said compartment from the weather, and upper and lower bearings supported from said receptacle and disposed behind the same to rotatably support said receptacle in front-to-back extent fully on one side of said post thus to assure powerful operation of said receptacle by the wind to leeward position of said access opening to the feed compartment, said upper bearing being an annular bearing seated onto the upper end of said post and said lower bearing being a side-access bearing to receive the side of said post and to abut the same under cantilever-like load of the receptacle.

HOOKER H. PARKER.

References Cited in the file of this patent

UNITED STATES PATENTS

| Number | Name | Date |
|---|---|---|
| D. 145,124 | Fenton | July 2, 1946 |
| 1,333,775 | Picotte | Mar. 16, 1920 |
| 1,337,483 | Romaniello | Apr. 20, 1920 |
| 1,545,007 | Milliken | July 7, 1925 |
| 1,796,466 | Lage | Mar. 17, 1931 |